United States Patent [19]

Kato et al.

[11] Patent Number: 4,628,091

[45] Date of Patent: Dec. 9, 1986

[54] PROCESS FOR PRODUCING DIANTHRAQUINONE-N,N'-DIHYDRAZINE AND ITS CHLORINATION PRODUCT

[75] Inventors: Kimitoshi Kato; Hiroshi Aiga; Tamio Mikoda; Tunehiro Sakai, all of Ohmuta, Japan

[73] Assignee: Mitsui Toatsu Chemicals, Inc., Tokyo, Japan

[21] Appl. No.: 620,398

[22] Filed: Jun. 13, 1984

[30] Foreign Application Priority Data

Jun. 16, 1983 [JP] Japan .................................. 58-106789
Feb. 27, 1984 [JP] Japan .................................. 59-34405

[51] Int. Cl.$^4$ ............................................ C07D 241/46
[52] U.S. Cl. ...................................... 544/339; 544/341
[58] Field of Search ................................ 544/339, 341

[56] References Cited

U.S. PATENT DOCUMENTS 3,268,532 8/1966 Zerwede ............................ 544/339

FOREIGN PATENT DOCUMENTS 1280 1/1965 Japan .
17222 2/1976 Japan .

OTHER PUBLICATIONS

Mansharamani, J. Indian Chem. Soc., vol. 53, pp. 167–171.

Primary Examiner—Mark L. Berch
Attorney, Agent, or Firm—Fisher, Christen & Sabol

[57] ABSTRACT

A process for producing dianthraquinone-N,N'-dihydrazine or its chlorination product, which comprises condensing 1-aminoanthraquinone at an elevated temperature in the presence of 1,3-dimethyl-2-imidazolidinone using an oxidizing agent and an alkaline condensing agent, and subjecting the resulting condensation product to a treatment known per se.

4 Claims, No Drawings

PROCESS FOR PRODUCING DIANTHRAQUINONE-N,N'-DIHYDRAZINE AND ITS CHLORINATION PRODUCT

This invention relates to an improved process for producing dianthraquinone-N,N'-dihydrazine and its chlorination product.

Dianthraquinone-N,N'-dihydrazine is represented by the following formula (I)

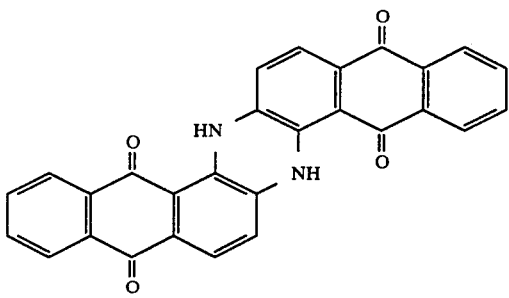

and is also called indanthrone. A chlorination product of dianthraquinone-N,N'-dihydrazine is represented by the following formula (II)

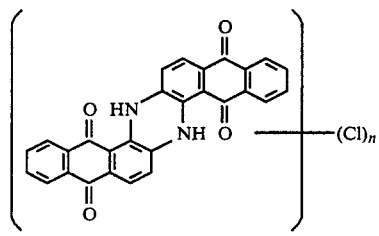

wherein n is 1 or 2,
and is also called chloro-indanthrone. Both are important as vat dyes. In particular, the compound of formula (II) has long been described in Color Index as C.I. Vat Blue 6 or C.I. Vat Blue 14.

A known conventional process for producing dianthraquinone-N,N,'-dihydrazine (to be abbreviated sometimes as indanthrone) comprises melting 2-aminoanthraquinone with potassium in the presence of an oxidizing agent (PB Report BIOS987, FIAT1313). According to this process, most of 2-aminoanthraquinone changes to hydroxyanthraquinones and an isomer of indanthrone because of secondary reactions, and consequently, the yield of the desired indanthrone is far below general industrial reaction yields.

On the other hand, many attempts have been made to produce indanthrone from 1-aminoanthraquinone as a raw material, and for example it is known that indanthrone can be obtained in a yield of about 70% by melting 1-aminoanthraquinone in potassium phenolate. This product, however, contains many impurities, and in order to make it commercially valuable, it must be further purified. The yield of the product therefore decreases considerably in the purifying step.

Japanese Laid-Open Patent Publication No. 17222/1976 describes the reaction of 1-aminoanthraquinone and an alkaline condensing agent in the presence of a phosphorus- or nitrogen-containing organic oxide such as hexamethylphosphorotriamide, pyridine-N-oxide or quinoline-N-oxide, and states that indanthrone is obtained in a high yield from 1-aminoanthraquinone. However, when the present inventors repeated a working example of this patent document in which pyridine-N-oxide was used, the crude yield of indanthrone was only about 70%, and no satisfactory result was obtained. In addition, hexamethylphosphorotriamide is not so cheap as to permit industrial application, and there is a warning against its carcinogenicity. Pyridine-N-oxide and quinoline-N-oxide are also expensive, and since they lack stability, they are considerably difficult to recover.

Japanese Patent Publication No. 1280/1965 discloses that indanthrone and its homolog are produced by treating a suitable primary amine of anthraquinone with an alkaline condensing agent at a temperature of 80° to 140° C. in the presence of a large amount of an organic sulfone or sulfoxide, advantageously in the presence of an oxidizing agent. However, when the present inventors repeated a working example described in this patent document, by-products such as hydroxyanthraquinone were formed in considerable amounts. The yield of the product did not reach the value described there, and the quality of the product was not sufficient.

Various methods are known, on the other hand, for the production of the chlorination product of dianthraquinone-N,N'-dihydrazine represented by formula (II) (to be sometimes abbreviated as chloro-indanthrone). For example, there are a method in which the bromine atom of a bromination product of indanthrone is replaced by a chlorine atom, and a method in which a chlorinated aminoanthraquinone such as 1,3-dichloro-2-aminoanthraquinone is condensed. But industrially, chlorination of indanthrone is widely practiced.

Typical examples of the chlorination include chlorination of indanthrone in an inert organic solvent such as nitrobenzene (for example, U.S. Pat. No. 2,205,418), and addition of a small amount of manganese dioxide to indanthrone in sulfuric acid, followed by the action of chlorine on it (for example, Yutaka Hosoda "Riron Seizo Senryo Kagaku" (Theoretical Dye Chemistry for Manufacture), page 699). In these chlorinating methods, isolated indanthrone having such a high purity as to be usable as C.I. Vat Blue 4 is usually employed as a starting material.

Specifically, there is used, for example, a method which comprises condensing 1-aminoanthraquinone by the action of an alkaline condensing agent in the presence of an oxidizing agent and a solvent such as dimethyl sulfoxide, subjecting the condensation product to after-treatment steps such as reductive purification and air oxidation which are normally performed in order to convert it to indanthrone, and thereafter chlorinating the resulting indanthrone having high purity.

A method is also known in which the condensation product mentioned above is directly chlorinated in sulfuric acid as a solvent without subjecting it to such an after-treatment. According to this method, large amounts of impurities exist in the product. To obtain the desired product of good quality by this method, the range within which the amount and concentration of sulfuric acid can be adjusted in the purifying step are limited. Hence, no satisfactory yield can be obtained.

As stated above, in order to obtain chloroindanthrone of high quality in a high yield by chlorinating indanthrone, it is necessary to produce indanthrone or its condensation product having high quality. With the aforesaid methods of producing indanthrone, indanthrone having high purity cannot be obtained in satisfactory yields because considerable amounts of by-products such as hydroxyanthraquinone are formed. Hence, chloro-indanthrone of high quality cannot be obtained in high yields.

It is an object of this invention, therefore, to provide a process for producing dianthraquinone-N,N'-dihydrazine or its chlorination product having very good quality in high yields by condensing 1-aminoanthraquinone with an alkaline condensing agent in the presence of an oxidizing agent.

Another object of this invention is to provide an industrially excellent process for producing indanthrone and chloroindanthrone.

These objects of the invention are achieved by performing the aforesaid condensation reaction in the presence of 1,3-dimethyl-2-imidazolidinone.

The process of this invention can give indanthrone having very good quality in a high yield as compared with the condensation reaction in the presence of a phosphorus- or nitrogen-containing organic oxide such as hexamethylphosphorotriamide, pyridine-N-oxide or quinolie-N-oxide. Hence, chlorination of the resulting indanthrone in a customary manner can give chloroindanthrone of high quality in a high yield. In particular, even when the condensation product is chlorinated directly in sulfuric acid as a solvent, chloro-indanthrone of high quality can be obtained in a high yield in spite of the simplified process steps. This is because the condensation of 1-aminoanthraquinone is carried out in the presence of 1,3-dimethyl-2-imidazolidinone, and consequently the amounts of impurities in the condensation product are very small.

1,3-Dimethyl-2-imidazolidinone of the formula

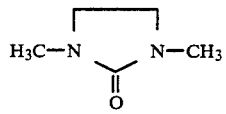

is relatively cheap, and easily available. The amount of this compound used is 0.05 to 10 parts by weight, preferably 0.1 to 5.0 parts by weight, more preferably 1.0 to 3.0 parts by weight, per part by weight of 1-aminoanthraquinone. 1,3-Dimethyl-2-imidazolidinone may be used as a mixture with an organic solvent such as pyridine, toluene, xylene or nitrobenzene.

The alkaline condensing agent used in this invention may, for example, be an alkali metal hydroxide such as potassium hydroxide or sodium hydroxide, potassium hydroxide being most suitable. It is used in the form of a solid or an aqueous solution. The amount of the alkaline condensing agent used is 0.1 to 10 parts by weight, preferably 0.2 to 2.5 parts by weight, per part by weight of 1-aminoanthraquinone.

In order to have the reaction proceed smoothly, an oxidizing agent such as air, oxygen, peracid salts (such as alkali metal perborates), nitric acid salts and chloric acid salts is used. Air or oxygen is easy to handle and industrially advantageous.

In some cases, it is advantageous to add a wetting agent which withstands the alkali metal hydroxides normally used in the production of indanthrone, for example naphthalene- or alkylnaphthalene-alkali metal sulfonate or sulfurated oleinamide to the reaction medium.

1-Aminoanthraquinone may be used in the form of a powder, but by adjusting the amount of water used, it may also be used as a wet filtration cake or a slurry. When it is used as a slurry, a part or the whole of the alkaline condensing agent may be added to it. Alternatively, there may be used a slurry of 1-aminoanthraquinone which has been finely divided after addition of the wetting agent or a surface-active agent.

In the process of this invention, too, a trace of the starting 1-aminoanthraquinone changes to a by-product. The unreacted 1-aminoanthraquinone can be easily recovered from the filtrate obtained at the time of separating the resulting indanthrone, and can be re-used directly.

1,3-Dimethyl-2-imidazolidinone can also be recovered by distillation at atmospheric or reduced pressure or by solvent extraction since it is stable under alkalinity.

In the process of this invention, the reaction temperature varies depending upon the amount of 1,3-dimethyl-2-imidazolidinone and the kind of the solvent used. Generally, temperatures of 80° to 150° C. are suitable. When the reaction temperature is high, the main reaction is promoted. But a side reaction also proceeds, and the purity of 1-aminoanthraquinone recovered tends to be reduced. If the reaction temperature is low, a reverse tendency is observed.

After separation, the resulting condensation product of 1-aminoanthraquinone is subjected to an ordinary after-treatment known for indanthrone in order to purify it.

The after-treatment step for indanthrone comprises slurrying the condensation product using water, subjecting the slurry to a reducing treatment with sodium hydrosulfite in the presence of an alkali metal hydroxide such as sodium hydroxide, crystallizing the sodium salt of a leuco derivative of dianthraquinone-N,N'-dihydrazine, separating the crystals by filtration, slurrying the filtration cake with water, and oxidizing the slurry with air to obtain purified indanthrone.

In producing chloroindanthrone of formula (II) from indanthrone obtained by the process of this invention, an ordinary chlorination method, for example a known chlorination method of chlorinating indanthrone in sulfuric acid as a solvent, can be applied. Since, however, the indanthrone condensation product obtained by the process of this invention has an extremely small content of impurities, the aforesaid indanthrone after-treatment step carried out to obtain chloroindanthrone of formula (II) is not always necessary in usual cases, and the condensation product separated from the reaction mass may be directly chlorinated. Chloroindanthrone of formula (II) obtained by direct chlorination can give a comparable brilliant dyeing when used as a dye.

In the direct chlorination, the condensation product which has been separated, washed with water and dried is diluted with water or an organic solvent and filtered. The resulting filtration cake either in the wet or dry state is dissolved in sulfuric acid so that during the chlorination, the concentration of sulfuric acid is about 92%. The solution is subjected to chlorination at a temperature of about 50° to about 55° C., in the presence of manganese dioxide as required, in the same way as in the chlorination of usual purified indanthrone.

After the chlorination, the chlorination reaction mass is diluted with water to adjust the concentration of sulfuric acid to about 83% and then filtered. The filtration cake is completely dissolved in 98% sulfuric acid and reduced with aluminum powder, etc. to give chloroindanthrone of formula (II).

The following examples illustrate the present invention specifically. All percentages in these examples are by weight.

EXAMPLE 1

145.7 g of 1-aminoanthraquinone was added to 235 g of 1,3-dimethyl-2-imidazolidinone (a product of Kawaken Fine Chemicals, Co., Ltd.), and the mixture was heated to 95° to 100° C. While air was passed at a rate of 300 ml/min., 141 g of a 50% aqueous solution of potassium hydroxide was added dropwise over 3 hours. After the addition, the temperature of the mixture was raised to 125° to 130° C., and a part of water was distilled off over 7 to 8 hours. The reaction mixture was further maintained at this temperature for 1 hour to terminate the reaction. The reaction mixture was put into 600 ml of water, and the resulting precipitate was separated by filtration and washed.

The filtration cake was put in 4900 ml of hot water having 153 g of sodium hydroxide dissolved in it, and 83 g of sodium hydrosulfite was added at 60° C. The mixture was stirred for 20 minutes. The temperature was then lowered to 50° C. to crystallize the sodium salt of a leuco derivative of dianthraquinone-N,N'-dihydrazine. The suspension was filtered at the same temperature, and the filtration cake was oxidized with air to form 130.0 g of pure dianthraquinone-N,N'-dihydrazine. The yield was 90% based on the 1-aminoanthraquinone used.

EXAMPLE 2

145.7 g of 1-aminoanthraquinone was added to a mixture of 145.7 g of 1,3-dimethyl-2-imidazolidinone and 51 g of xylene, and the mixture was heated to 95° to 100° C. While air was passed at a rate of 300 ml/min., 141 g of a 50% aqueous solution of potassium hydroxide was added dropwise over 3 hours. After the addition, the temperature was raised to 125° to 130° C., and over 6 to 7 hours, a part of water was distilled off as an azeotrope with xylene. The distilled xylene was separated and returned to the reaction mass. After the reaction, the reaction mass was maintained at the same temperature for one hour to distill off xylene. The reaction mixture was added to 700 ml of water, and the resulting precipitate was separated by filtration and washed.

The filtration cake was worked up in the same way as in Example 1 to give 128.2 g of pure dianthraquinone-N,N'-dihydrazine. The yield was 88.8% based on the 1-aminoanthraquinone used.

EXAMPLE 3

186 g of 1-aminoanthraquinone was added to 240 g of 1,3-dimethyl-2-imidazolidinone, and the mixture was heated. While air was passed at a rate of 300 ml/min., 180 g of a 50% aqueous solution of potassium hydroxide was added dropwise at 115° to 120° C. over 3 hours. 48 g of water was distilled off in 6 to 8 hours from the start of the dropwise addition. The mixture was then further stirred at the same temperature while passing air. The reaction mixture was put in water, and the resulting precipitate was separated by filtration.

The resulting filtration cake (in one-sixth of its amount as obtained) was added to a solution of 36 g of sodium hydroxide in 1000 g of water, and at 60°C., 15 g of sodium hydrosulfite was added. The mixture was stirred for 30 minutes. The temperature was lowered to 47°–48° C. to crystallize the sodium salt of a leuco derivative of dianthraquinone-N,N'-dihydrazine. The suspension was filtered at the same temperature to remove soluble impurities, and then subjected to air oxidation in a known manner to give 26.1 g of pure dianthraquinone-N,N'-dihydrazine. The yield was 85% based on the 1-aminoanthraquinone used.

EXAMPLE 4

100 g of 1-aminoanthraquinone and 2.2 g of a 50% aqueous solution of potassium hydroxide were added to 230 g of 1,3-dimethyl-2-imidazolidinone. The mixture was heated to 100° C., and while air was passed at a rate of 450 ml/min., 94.7 g of a 50% aqueous solution of potassium hydroxide was added dropwise over 3 hours. After the addition, the temperature was raised to 130° C., and over 6 to 7 hours, water was distilled off. The reaction mass was further maintained at this temperature for 1 hour to terminate the reaction. The reaction mixture was added to 400 ml of water, and the resulting precipitate was separated by filtration and washed.

The filtration cake was added to 3300 ml of hot water having 227 g of 45% sodium hydroxide dissolved in it, and 56 g of sodium hydrosulfite was added at 60° C. The mixture was stirred for 20 minutes. The temperature was lowered to 50° C., and the precipitated crystals were separated by filtration. The filtration cake was oxidized with air by a known method to give 90 g of pure dianthraquinone-N,N'-dihydrazine. The yield was 90% based on the 1-aminoanthraquinone used.

EXAMPLE 5

130 g of pure dianthraquinone-N,N'-dihyhdrazine obtained in Example 1 was dissolved in 1365 g of 91.5% sulfuric acid, and 6.5 g of manganese dioxide was added. 100 g of chlorine was passed through the mixture for 12 hours to chlorinate the dianthraquinone-N,N'-dihydrazine. The reaction mass was poured into 167 g of 75% sulfuric acid, and 145 g of water was added at below 55° C. By standing, the mixture was cooled to 25° C., and then filtered and washed. The filtration cake was dissolved in a mixture of 370 g of 96% sulfuric acid and 520 g of 24% oleum, and 3.0 g of aluminum powder was added at 50° C. The mixture was stirred and then discharged into water, followed by filtration, washing with water and drying to give 120 g of chlorinated dianthraquinone-N,N'-dihydrazine [corresponding to formula (II) in which n is about 2, and to C.I. Vat Blue 6]. The chlorine content of the product was 13.7%, and the yield was 83.0% based on the 1-aminoanthraquinone used.

EXAMPLE 6

100 g of 1-aminoanthraquinone was added to 200 g of 1,3-dimethyl-2-imidazolidinone, and the mixture was heated. While air was passed at a rate of 300 ml/min., 97 g of a 50% aqueous solution of potassium hydroxide was added dropwise at 100° to 105° C. over 3 hours. While water was distilled off from the reaction system, the reaction was carried out at 130° to 135° C. for 4 hours. The reaction mass was added to water, and the resulting precipitate was separated by filtration. The filtration cake was washed with water and dried to give 99 g of the condensation product (yield 99% based on the 1-aminoanthraquinone used.

The resulting condensation product was dissolved in 760 g of 98% sulfuric acid, and 54.0 g of water was added to adjust the concentration of sulfuric acid to 91.5%. Then, about 130 g of chlorine was passed through the solution at 50° to 55° C. over 17 hours to chlorinate the condensation product. Water was added at a temperature lower than 50° C. to adjust the concentration of sulfuric acid to about 80%. The solution was cooled to 25° C., and filtered. The filtration cake was dissolved in 470 g of 98% sulfuric acid, and 2.3 g of aluminum powder was added at 50° C. The mixture was stirred and then discharged into water, followed by filtration, washing with water and drying to give 104 g of chlorinated dianthraquinone-N,N'-dihydrazine [corresponding to formula (II) in which n is about 2, and also to C.I. Vat Blue 6]. The chlorine content of the product was 13.6%, and the yield was 104% based on the 1-aminoanthraquinone used.

When a cotton cloth was dyed with the resulting product by an ordinary vat dyeing method, a brilliant blue dyeing was obtained.

EXAMPLE 7

100 g of 1-aminoanthraquinone was added to 250 g of 1,3-dimethyl-2-imidazolidinone and 2.2 g of 50% potassium hydroxide, and the mixture was heated. While air was passed at 100° to 105° C., 97 g of a 50% aqueous solution of potassium hydroxide was added dropwise over 3 hours. While water was distilled off from the reaction system, the reaction was carried out at 130° to 135° C. for 6 hours. The reaction mass was added to water, and the resulting precipitate was separated by filtration. The filtration cake was washed with 80% aqueous methanol and dried to give 99 g of the condensation product (yield 99% based on the 1-aminoanthraquinone used).

The condensation product was dissolved in 940 g of 98% sulfuric acid, and 66.8 g of water was added to adjust the concentration of sulfuric acid to 91.5%. Then, about 70 g of chlorine was passed through the solution at 50° to 55° C. over 10 hours to chlorinate the condensation product. Water was then added at below 50° C. to adjust the concentration of sulfuric acid to about 80%. The solution was cooled to 25° C. and filtered. The filtration cake was dissolved in 500 g of 98% sulfuric acid, and 2.3 g of powder was added at 50° C. The mixture was stirred and then discharged into water, followed by filtration, washing with water and drying to give 96.8 g of chlorinated dianthraquinone-N,N'-dihydrazine [corresponding to formula (II) in which n is about 1, and also to C.I. Vat Blue 14]. The chlorine content of the product was 8.0%, and the yield was 96.8% based on the 1-aminoanthraquinone used.

When a cotton cloth was dyed with the resulting product by an ordinary vat dyeing method, a brilliant blue dyeing was obtained.

COMPARATIVE EXAMPLE 100 g of 1-aminoanthraquinone was added to 180 g of dimethyl sulfoxide, and the mixture was heated. While air was passed at a rate of 300 ml/min., 97 g of a 50% aqueous solution of potassium hydroxide was added dropwise at 100° to 105° C. over 3 hours. While water was distilled off from the reaction system, the reaction was carried out at 115° to 120° C. for 3 hours. The reaction mixture was then worked up in the same way as in Example 6 to give 91.7 g of the condensation product (yield 91.7% based on the 1-aminoanthraquinone used).

The condensation product was chlorinated, filtered at a sulfuric acid concentration of about 80% and aftertreated under the same conditions as in Example 6 to give 86 g of chlorinated dianthraquinone-N,N'-dihydrazine [corresponding to formula (II) in which n is 2, and also to C.I. Vat Blue 6]. The chlorine content of the product was 13.7%, and the yield was 86% based on the 1-aminoanthraquinone used, which is lower than the yield obtained in Example 6.

When a cotton cloth was dyed with the resulting product by an ordinary vat dyeing method, a dyeing of a greenish dark color was obtained.

What we claim is:

1. A process for producing dianthraquinone-N,N'dihydrazine or its chlorination product, which process comprises condensing 1-amino-anthraquinone at an elevated temperature in the presence of 1,3-dimethyl-2-imidazolidinone using an oxidizing agent and an alkaline condensing agent, from 1.0 to 10 parts by weight of the 1,3-dimethyl-2-imidazolidinone and from 0.1 to 10 parts by weight of the alkaline condensing agent being used per part by weight of the 1-aminoanthraquinone, and subjecting the resultant condensation product to purification.

2. A process according to claim 1 wherein the condensation product is reduced and then oxidized to give dianthraquinone-N,N'-dihydrazine.

3. A process according to claim 1 wherein the condensation product is reduced and then oxidized to give dianthraquinone-N,N'-dihydrazine, and thereafter dianthraquinone-N,N'-dihydrazine is chlorinated to give its chlorination product.

4. A process according to claim 1 wherein the condensation product is chlorinated in sulfuric acid as a solvent to give a chlorination product of dianthraquinone-N,N'-dihydrazine.

* * * * *